UNITED STATES PATENT OFFICE.

H. J. M. PUISTIENNE, OF PARIS, FRANCE.

IMPROVED MODE OF TREATING COPPER ORES.

Specification forming part of Letters Patent No. 34,591, dated March 4, 1862.

*To all whom it may concern:*

Be it known that I, HIPPOLYTE JOSEPH MARIE PUISTIENNE, professor of chemistry, in Paris, in the Empire of France, have invented new and useful Improvements in the Treatment of Copper Ores, and particularly of cupreous yellow pyrites; and I hereby declare the following to be a full, clear, and exact description of the same.

Copper is a metal the ores of which are sufficiently numerous, as it is found in the state of native copper as an oxide, a carbonate, and as a pure sulphuret.

It is sufficient to be acquainted with the first principles of chemistry to know that the working of the ore above mentioned is attended with but little difficulty, for which reason those countries in which they are found may consider themselves favored; but gray copper ore, and especially the double sulphuret of copper and iron, (or copper pyrites,) are also found. The method of working these latter ores, according to the process hitherto employed for some time, consists in alternate roasting and smelting, which operations produce lumps more or less rich in copper, and also scoriæ more or less rich in iron. Black copper ore is also obtained containing sulphur and more or less iron. This latter is converted into metallic copper by the refining process, and in these long processes heat and air are the agents, the greater affinity of copper for sulphur, and of iron for oxygen, slowly effecting the remainder.

Struck with the abundance of copper pyrites, and also with the slowness and difficulties attending their working, I have succeeded in much simplifying the operations necessary for the extraction of the copper from pyrites, as by my improved process the metallic copper is obtained in a malleable state by two operations, which are effected with great simplicity and economy.

In carrying out this invention the pyrites are first pulverized in any ordinary manner, and then, by means of ordinary fluxes and sulphur and chloride of calcium, the ore, whether roasted or not, may be operated upon. In the case of roasted ore, a certain weight of the ore is to be mixed with variable quantities of sulphur and chloride of calcium, according to the richness of the ore and the nature of its gangue. The exact proportions of the several ingredients can only be determined by experiment. The ingredients are then heated to a considerable temperature, so as to cause the substances to amalgamate, and a lump of sulphuret of copper will be produced, which, on being roasted and heated with charcoal, will produce metallic copper in a malleable state; or this sulphuret, on being mixed in suitable proportions with the oxide of copper or native oxide, may, by the simple action of heat, produce metallic copper from the two bodies combined.

By causing sulphur and chloride of calcium to act either simultaneously or separately, and taking care to cause the weights to correspond with the richness of the ore and the nature of its gangue, sulphuret of copper may be obtained by a single operation without roasting, and metallic copper will be obtained when the roasting operation has been carried to a certain point. Chloride of lime may be employed instead of chloride of calcium, and I have also obtained sulphuret of copper by heating a mixture of sulphur and lime with coppery pyrites. If the copper pyrites or other ore of copper contains arsenic, antimony, zinc, nickel, cobalt, or other injurious or deleterious matters in quantities of sufficient importance, the pulverized ore should be first mixed with chloride of calcium or sodium, and the mixture then roasted, in order to volatilize the deleterious metals in the state of chloride.

The advantages of this invention are as follows, viz: first, the rapid production of the metal; second, a considerable if not entire economy of the waste products; third, considerable economy in the cost of production.

When operated upon according to this method even the gray copper ore gives satisfactory results. Instead of pure sulphur, raw sulphur may be employed, or any other substance which will furnish the requisite quantity of sulphur.

Having now described this my invention of improvements in the treatment of copper ores, and having explained the manner of carrying the same into effect, I desire it to be understood that I claim—

The mode herein set forth of treating copper ores, and particularly the application of sulphur and chloride of calcium or chloride of lime, or other chlorides, for the purposes of the present invention; and I wish it to be understood that the proportions of the chemical agents above mentioned may be varied according to the nature of the copper ores to be operated upon.

In testimony whereof I have signed my name to this specification before two subscribing witnesses.

HTE. PUISTIENNE.

Witnesses:
   TH. LANGRUNIG,
   S. CROZET NOYES.